United States Patent [19]
Grenier

[11] Patent Number: 4,733,558
[45] Date of Patent: Mar. 29, 1988

[54] BRAKE TORQUE LOADING LINKAGE FIXTURE

[75] Inventor: Glen C. Grenier, Chanhassen, Minn.

[73] Assignee: MTS Systems Corporation, Eden Prairie, Minn.

[21] Appl. No.: 933,017

[22] Filed: Nov. 20, 1986

[51] Int. Cl.$^4$ ............................................. G01M 19/00
[52] U.S. Cl. ..................................... 73/118.1; 73/669
[58] Field of Search ...................... 73/118.1, 865.6, 669

[56] References Cited
U.S. PATENT DOCUMENTS

| | | | |
|---|---|---|---|
| 3,713,330 | 1/1973 | Lentz | 73/93 |
| 3,821,893 | 7/1974 | Klinger et al. | 73/118.1 |
| 3,827,289 | 8/1974 | Borg | 73/118.1 X |
| 4,133,201 | 1/1979 | Klinger | 73/12 |
| 4,263,809 | 4/1981 | Petersen et al. | 73/798 |

*Primary Examiner*—Jerry W. Myracle
*Attorney, Agent, or Firm*—Kinney & Lange

[57] ABSTRACT

A brake torque loading linkage for vehicle spindle test fixtures permits applying a brake torque load while other loads are being applied, particularly vertical loading, where substantial movement is encountered, without requiring substantial compensation. The brake torque loading actuator is mounted to move with the vertical loading linkage. The reference for the brake torque is thus on the linkage that moves for applying the vertical load and there is no need to compensate for vertical movements of the spindle being tested when applying the brake torque. The linkage utilized comprises a bell crank loading linkage that is used for applying the torque to a spindle and in particular is useful for testing spindles mounted on pivoting swing arm mountings.

9 Claims, 5 Drawing Figures

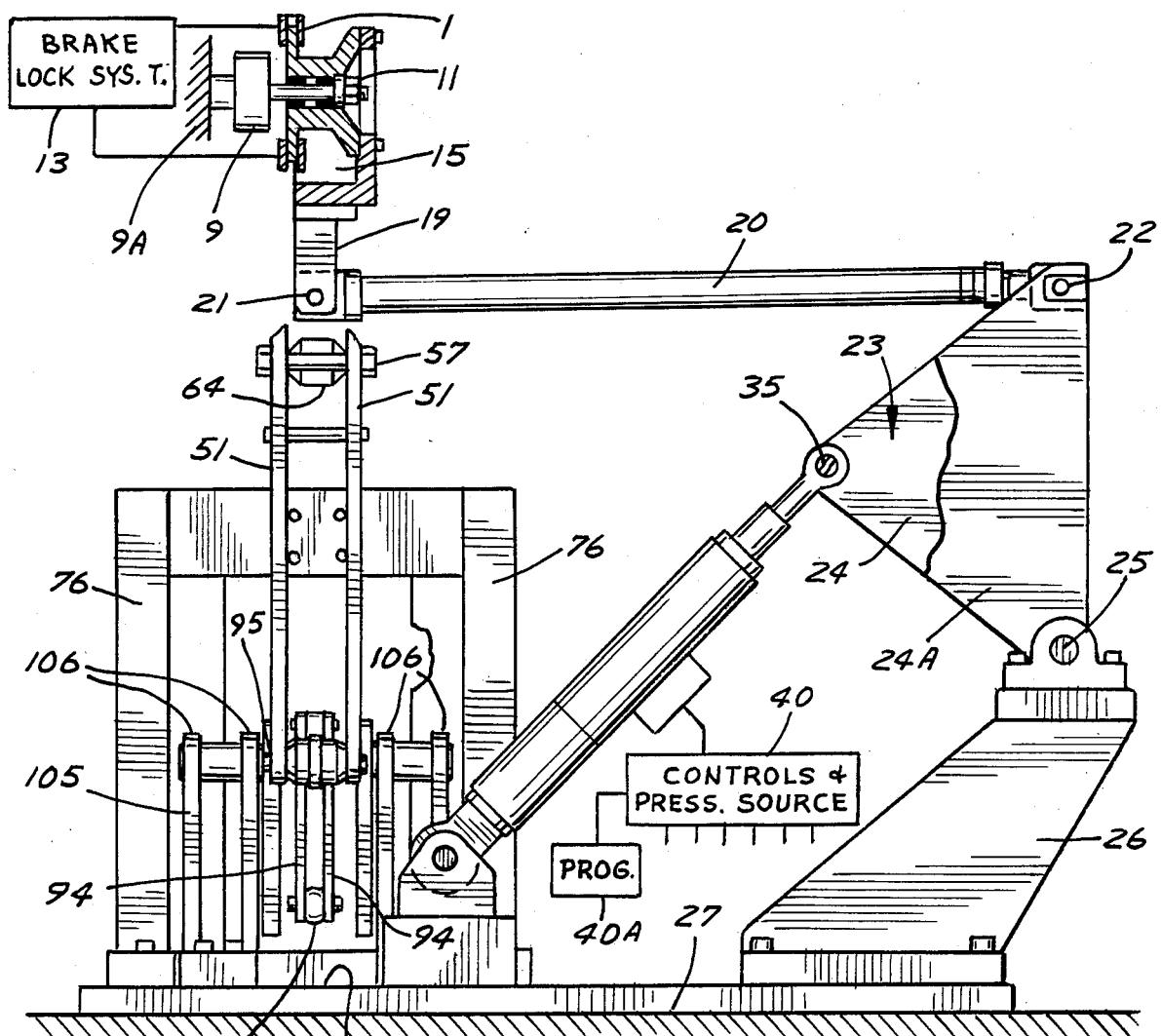
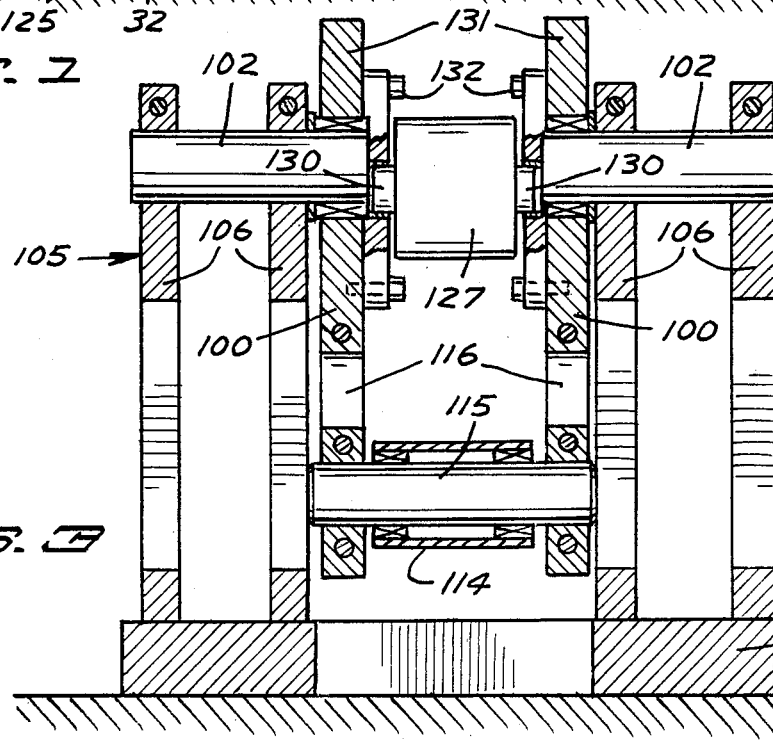

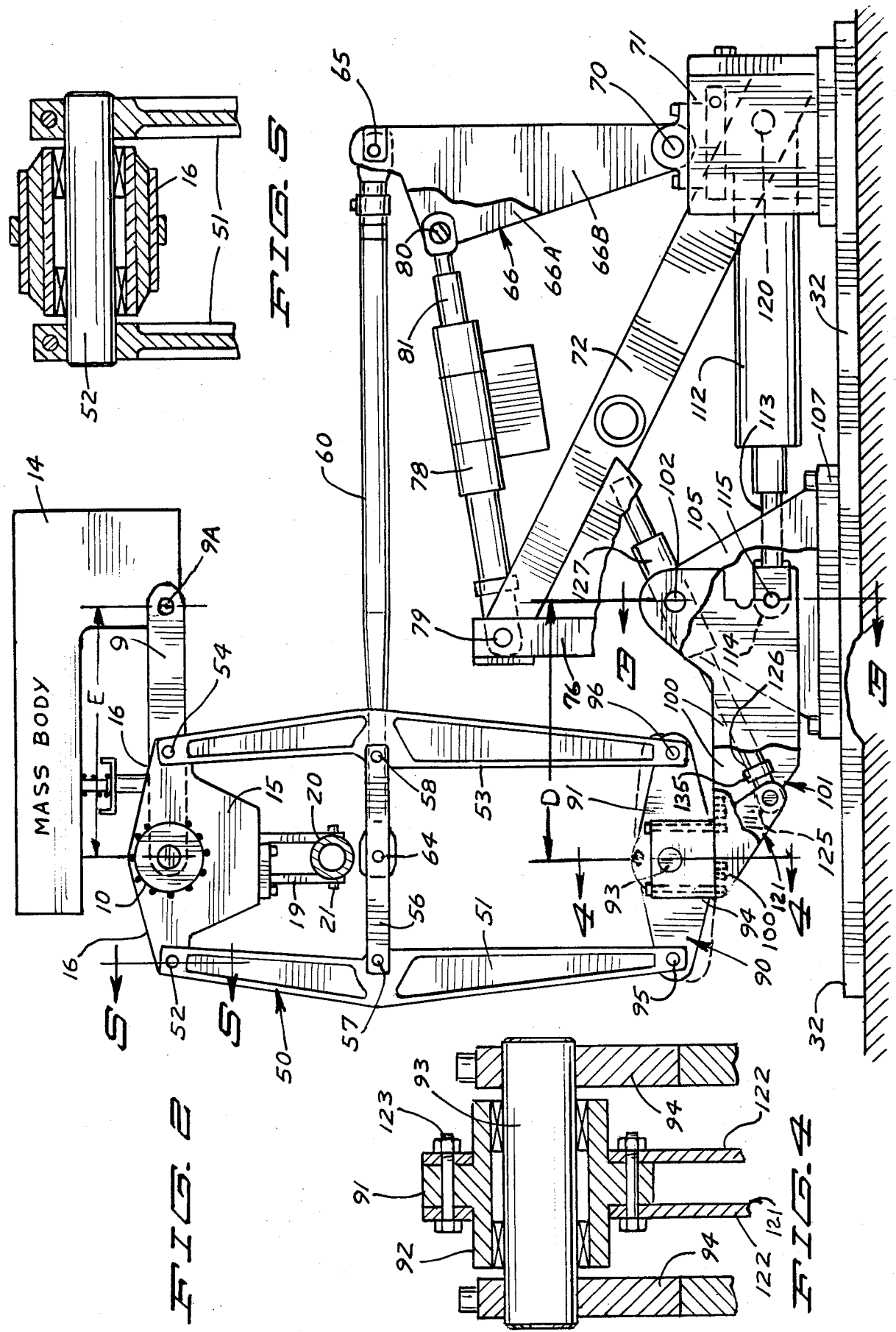

4,733,558

BRAKE TORQUE LOADING LINKAGE FIXTURE

BACKGROUND OF THE INVENTION

1. Field of the Invention

The present invention has relations to test loading linkages, and in particular to a linkage for applying a brake torque load during the testing of vehicle suspension systems.

2. Description of the Prior Art

In the prior art, various test fixtures have been advanced for loading wheels on vehicles for testing the axles and spindles.

U.S. Pat. No. 4,236,809 shows a tetra-axle vehicle test fixture. This patent, issued to Petersen et al. on Apr. 28, 1981, shows a mounting for testing all four wheels on a vehicle simultaneously, by applying the necessary loads for simulating road operation of the vehicle.

U.S. Pat. No. 3,713,330, issued to Lentz on Jan. 30, 1983, shows a compact axle test device which comprises the basic test system being utilized in the present device. A brake torque actuator is added in the present device.

Providing braking loads in such a test system has been done, as shown in U.S. Pat. No. 4,133,201, issued to Klinger. However, this type of device does not permit dynamic loading of brake torque or loading through the moving mechanism.

SUMMARY OF THE INVENTION

The present invention relates to a brake torque loading actuator that is mounted onto the vertical load application device for testing a wheel spindle, and which applies a torque tending to rotate the spindle that in turn is referenced to the actual position of the wheel spindle in vertical direction because the brake torque loading device is mounted onto the mechanism that provides the vertical loading.

In the form shown, a fixture for loading the spindles in several directions is shown schematically, and the present brake torque loading actuator mounts onto the vertical loading system to minimize the amount of compensation that is necessary to minimize brake torque loads during spindle vertical travel and which references the brake torque loading kinematically to the vehicle spindle position in the test fixture.

An actuator is mounted to be moved with the vertical loading mechanism, and this separate brake torque actuator is connected to a linkage that will put on a torque load onto the spindle loading fixture to simulate brake torque loads during testing.

BRIEF DESCRIPTION OF THE DRAWINGS

FIG. 1 is a front elevational view of a typical loading fixture having a brake torque loading actuator made according to the present invention thereon;

FIG. 2 is a side elevational view thereof showing the brake torque loading device made according to the present invention;

FIG. 3 is a fragmentary sectional view taken as on line 3—3 in FIG. 2;

FIG. 4 is a sectional view taken as on line 4—4 in FIG. 2; and

FIG. 5 is a fragmentary sectional view taken on line 5—5 in FIG. 2.

DETAILED DESCRIPTION OF THE PREFERRED EMBODIMENTS

Referring first to FIG. 1, the front elevational view of the loading device illustrates a typical spindle loading assembly indicated generally at 10, which is designed for testing a wheel spindle 11 (and associated suspension) of an automobile which comprises the test specimen. The wheel spindle in the form shown is mounted onto a trailing arm suspension indicated generally at 9 that has a mounting pivot 9A mounted to the frame of a vehicle. For example, the pivot 9A can be mounted onto a complete vehicle or it can be an individual test specimen that is mounted in a suitable manner for testing. A mass 14 represents the vehicle weight. The spindle must travel a substantial distance in vertical direction.

The spindle 10 has a load adapter 15, that is mounted thereon, which simulates a wheel hub and which can be restrained with a vehicle brake lock system 13 which is shown schematically. The adapter is mounted onto the specimen spindle 11. The adapter 15 also can have bolt holes that attach to a wheel hub mounted on the spindle and in such case the brake lock system 13 can be caliper brakes used on a conventional brake disc or drum brakes in a conventional manner. As shown, the specimen load adapter 15 is a rigid block that has rearwardly and forwardly extending ears 16,16 that are connected to suitable loading links, as will be more fully explained.

The view in FIG. 1 is to show that the vertical loading linkages generally comprise two spaced apart, parallel links that equalize loads, with the actuators themselves between the links forming the loading linkages. As shown in FIG. 1, a lateral input link 20 is pivotally connected as at 21 to a bracket 19 which is fixed to the adapter 15, and the opposite end of the link 20 is connected as at 22 to a bell crank assembly 23 comprising spaced apart plates at 24 and 24A, respectively, which in turn are mounted onto a pivot pin 25 that is supported on a pedestal 26, in turn supported onto a support member 32 and a base 27. The base 27 is a mass used for supporting the entire test fixture. The bell crank 23 is operated through a lateral input actuator 30 that has its lower end connected as at 31 to main support member 32 in a suitable manner. The support member 32 supports the test assembly on base 27 for vertical loading.

The rod end of the actuator 30 is connected as at 35 to a lobe of the bell crank 23, so that upon extending and retracting the rod of the actuator 30 the link 20 is loaded in tension and compression as desired. The type and amount of loading is programmed as shown in the prior patents, through suitable controls and pressure sources indicated at 40 that are coupled to the various actuators in a conventional manner. A program input 40A includes the desired loading sequence.

The lateral loading linkage applies load generally parallel to the axis of the spindle being tested and at about tire patch level (where a tire meets the road) to simulate actual loads on the spindle during testing.

The vertical and fore and aft loading devices are perhaps best seen in FIG. 2 where the lateral load link and actuator have been removed for sake of clarity.

The vertical load fixture comprises a link assembly 50 that has a pair of vertically extending loading links 51, that are coupled to the forward ear 16 on the specimen adapter 15 as at 52, and which are pivotally mounted thereon in a suitable manner. The links 51 are spaced apart, as can be seen in FIG. 1, to accomodate the specimen adapter 15. A trailing pair of links 53 that are parallel to and substantially identical to the links 51 are provided, and these links 53 are connected as at 54 to the trailing ear 16 on the specimen adapter 15. Thus, the pivot points 52 and 54 for the links 51 and 53 are longitudinally spaced, but generally are coplanar with the center of the wheel spindle 11 that is to be tested. The lateral loading link 20 is spaced between the links 51 and 53 as shown.

The links 51 and 53 are coupled together with a pair of connecting straps 56 that are pivotally mounted as at 57 and 58 at the fore and aft ends of the links 56, respectively, to the sets of links 51 and 53. These pivots comprise pins, and the pin for the pivot 57 can pass between the links 51 inside a spacer so the links 51 are held spaced by this connection 57. The pins forming the pivot 58 have to be individually connected to links 53 to permit a longitudinal loading link 60 to pass between the links 53. The longitudinal loading link 60 is connected as at 64 to the straps 56, respectively, and has its opposite end shown in FIG. 2, connected as at 65 to a bell crank assembly 66. The bell crank assembly 66 also comprises side plates 66A and 66B, that are spaced apart, and which are suitably connected as at 70 to a pedestal 71 connected onto the main support 32. A pair of spaced frame members 72 are connected to this pedestal 71 and extend upwardly and toward linkage 50. The frame members 72 are also supported on a vertical support 76, to provide a stable anchor for a longitudinal actuator 78. Actuator 78 has its first end connected as at 79 to the supports 72 and 73, and which has its second end connected as at 80 to the bell crank 66 at a position between the pivots 65 and 70. Upon extension and retraction of the rod 81 of the actuator 78 the bell crank 66 will pivot about its pivot connection 70 to apply tension or compression loads to the longitudinal loading link 60. The load on the link 60 will act through the straps 56, and the links 51 and 53, to apply longitudinal loads along the axis of the link 60 to the spindle 11 through the specimen adapter 15.

The vertical loads on the spindle are also provided through the links 51 and 53 comprising the loading assembly 50, and as shown in FIG. 2, the lower ends of the links 51 and 53 are positioned on opposite ends of a loading bar 90. As seen in FIG. 4, the loading bar comprises a central bar 91, mounted onto a hub 92 that in turn is rotatably mounted with suitable bearings on a pin 93 between adjustable bearing supports 94. The lower ends of links 51 and 53 are then in turn pivotally mounted as at 95 and 96, respectively, to the opposite ends of the bar 90.

The loading connection for vertical loading is thus through these pivot connections 95 and 96 and the loading bar 90.

The lower ends of the bearing supports 94 are adjustably mounted (for fore and aft movement) onto side plates 100 of a bell crank assembly 101 using cap screws and a plurality of adjusted holes on the ends of the plates 100. The plates 100 of the bell crank assembly 101 in turn are each suitably independently mounted on a separate pin 102 (see FIG. 3), so that the space between the plates 100, at the pivot point 102 is unobstructed.

Additionally, the pivot pins 102 are supported in a pivot support 105 that has a pair of plates 106 on opposite sides of the bell crank assembly 101 and these plates are in turn supported onto a suitable base 107 that is fixed to the support member 32. The base 107 on member 32 can be adjusted fore and aft in suitable slots in a conventional manner, as well.

The support blocks 94 also can be adjusted along the upper surface 110 of the plates 100 for adjustment fore and aft.

The bell crank 101 is actuated through a vertical actuator assembly 112, that has an extendable and retractable rod 113 operated through the controls 40, to provide a programmed loading sequence. The rod 113 has a rod end 114, pivotally mounted with a pin 115 to the rear edge of the plates 100 that form the bell crank 101. The pin 115 is capable of being placed in lower receptacles as shown in FIG. 2, or an upper receptacle 116 to change the leverage and the action.

It can be seen that extending and retracting the rod 113 in the actuator 112 will result in pivoting of the bell crank 101 about the pins 102, and this in turn will provide a vertical movement of the outer end of the bell crank causing the loading bar 90 to move up and down, and through the links 51 and 53 provide a vertical load to the specimen adapter 15 and thus to the spindle 11 to be tested.

The opposite end of the actuator 112 is mounted with a pin 120 back to the support block 71 to firmly anchor it to the base plate 32 and to the rest of the frame assembly.

In the present device, a "flying brake control" effect is achieved by controlling the movement of the loading bar assembly 90 about the axis of the pin 93. As shown, a brake loading arm 121 comprises a pair of plates 122,122 that are bolted onto the plate 91 forming the vertical loading bar. The plates 122 encircle the hub 92. The bolts are shown at 123 in FIG. 4, and the brake loading arm 121 extends downwardly as shown in FIG. 2, and receive the rod end indicated at 125 of the rod 126 of a brake loading actuator 127. The brake loading actuator 127 in turn, as can be seen in FIG. 3, has a pair of trunions 130,130 on opposite sides thereof which are rotatably received in bearing plates 131,131. The bearing plates 131 in turn are affixed with cap screws 132 to the plates 100 forming the vertical loading bell crank 101.

The trunions 130,130 for actuator 127 are ideally on the center of the pins 102,102. Some off set can be tolerated for clearance purposes. The brake loading actuator 127 is also operated through the controls 40, which are programmed to cause brake loading by extending and retracting the rod 126. This extension and retraction in turn will rotate the plate 91, and thus the vertical loading bar 90 to provide unequal vertical loading between the links 51 and 53, tending to rotate the loading adapter 15 about the axis of the spindle. If the brake lock system 13 is actively locking the brakes (conventional disc brakes may be used), this will allow a brake torque load to be applied to the spindle.

Because the actuator 127 is mounted onto the moving arms of the bell crank 101, there are only very slight (if any) differences in the amount of braking load when the actuator 112 is operated, even though the bar 90 moves in an arc because the distance "D" of the fixture and distance "E" of the specimen are adjusted at "D" to be equal by moving bearing supports 94 (see FIG. 2). Only the desired braking load is applied when the actuator 127 is operated even during movement of the bell crank 101.

The flying brake load application therefore eliminates the need for highly compensating the movement of the actuator 127 in the control circuitry in order to minimize the torque induced by movement of the vertical bell crank 101. It should be noted that the actuator 127 has a load cell 135 thereon, which provides feedback signals to the controls 40 so that the programmed input from program 40A as to the braking load can be quite closely followed in the conventional error signal control system for servo hydraulic systems.

All of the actuators shown can be operated simultaneously, and the braking loads can be applied as desired without needing to compensate greatly because the brake actuator moves with the vertical load applying bell crank. It should also be noted that when a swing arm spindle support assembly as shown is used, the spindle itself moves through an arc so that the upper ends of the lengths 51 and 53 also move off a center line of loading. Because the actuator 127 is not attached directly to the ground, these arcuate movements and their effects on the brake loads are minimized.

Although the present invention has been described with reference to preferred embodiments, workers skilled in the art will recognize that changes may be made in form and detail without departing from the spirit and scope of the invention.

What is claimed is:

1. A loading linkage for a spindle assembly having a hub and having a braking torque applying means, said spindle assembly being loaded in a plane lying along the axis of the spindle assembly and in a direction perpendicular to such axis, and also being held from rotation at selected times, including a linkage having bell crank means for applying the load in said plane as the bell crank is moved about a first pivot, and means for applying a torque load tending to rotate the hub relative to the axis of said spindle assembly, wherein the improvement comprises the means for applying a torque load to said hub including an actuator movable with the means for applying the load in said plane about substantially the same axis as said first pivot.

2. A device for loading a specimen in a plane, said specimen comprising a spindle having a spindle axis, a load adapter rotatably mounted relative to the spindle, brake means for preventing rotation of said load adapter relative to the spindle, said device for loading comprising means on said specimen for permitting rotational torques to be applied to the specimen about the spindle axis and for permitting movement of said specimen along a loading axis perpendicular to the axis of the spindle, means for applying a load along said loading axis comprising a pivoting bell crank member, a pair of spaced links coupled to the specimen on opposite sides of said loading axis, the bell crank member including means for simultaneously applying forces to the links to apply a load on the specimen transverse to the spindle axis, and means carried by said pivoting bell crank member tending to provide different loads in each of said links to in turn create a torque about said spindle axis.

3. The apparatus as specified in claim 2 wherein said means for applying different loads in said links comprises a lever arm, a bar member attached to said lever arm and pivotally mounted to ends of said links opposite from said specimen, and an actuator carried by said bell crank member to cause differential loads on said lever arm.

4. A loading assembly for a spindle having a hub thereon and brake means to prevent rotation of said hub, said loading assembly including means for applying longitudinal and axial loads on said spindle through said hub, separate means for applying a vertical load on said spindle through said hub, torque creating means coupled to said hub and spindle and to apply a torque to said hub while the separate means is operating, and means to mount said torque creating means on said separate means so the torque does not change substantially as the separate means is actuated.

5. The loading assembly of claim 4 wherein the means for applying a vertical load comprising a pair of spaced links having first ends coupled to the specimen and second ends mounted on a portion of the torque creating means, said torque creating means providing differential loading of said spaced links.

6. The loading assembly of claim 5 wherein in the separate means including a bell crank assembly carrying said torque creating means, the links being pivotally mounted as a unit on the bell crank assembly about a torque loading pivot, and an actuator forming part of the torque loading means mounted on the bell crank assembly and controlling position of the links about the torque loading pivot.

7. The loading assembly of claim 6 and means to pivotally mount the bell crank assembly about a bell crank pivot and means to adjust the position of the torque loading pivot relative to the bell crank pivot.

8. The loading assembly of claim 7 wherein said means for adjusting the position of the torque loading pivot relative to the bell crank pivot comprises a loading bar having opposite ends pivotally connected to the respective spaced links, and a mounting block, the mounting block supporting the torque loading pivot and being adjustably mounted for movement along said loading lever.

9. The loading assembly of claim 4 wherein said spindle is mounted for testing on a swing arm that has a pivot at one point, and the spindle on the swing arm being spaced from said pivot so that upon application of a vertical load on the spindle, the spindle is caused to move about said pivot along a first radius with respect to said pivot, said means to mount said torque creating means on said separate means including a loading lever, and means for adjusting the effective length of said loading lever to provide compensation for different first radius distances provided by different swing arms.

* * * * *